Figure 2:
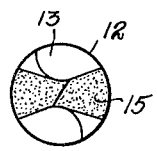

Oct. 23, 1934.  J. V. EMMONS  1,977,845
CUTTING AND FORMING TOOL, IMPLEMENT, AND THE LIKE AND METHOD OF MAKING SAME
Original Filed Dec. 22, 1928   2 Sheets-Sheet 1

INVENTOR.
Joseph V. Emmons
BY
Fay, Oberlin & Fay
ATTORNEYS.

Oct. 23, 1934.   J. V. EMMONS   1,977,845
CUTTING AND FORMING TOOL, IMPLEMENT, AND THE LIKE AND METHOD OF MAKING SAME
Original Filed Dec. 22, 1928    2 Sheets-Sheet 2
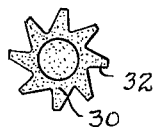
Fig. 12
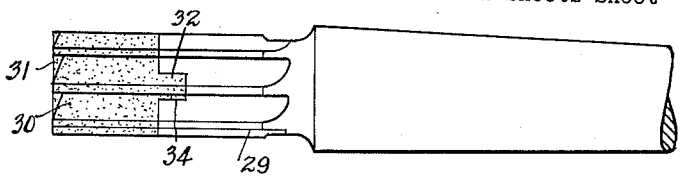
Fig. 11
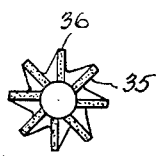
Fig. 14
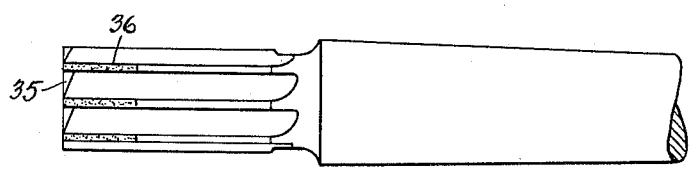
Fig. 13
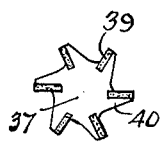
Fig. 16
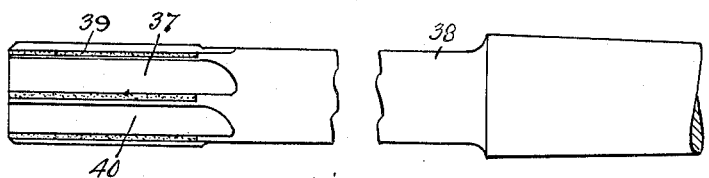
Fig. 15
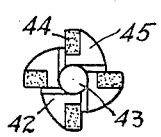
Fig. 18
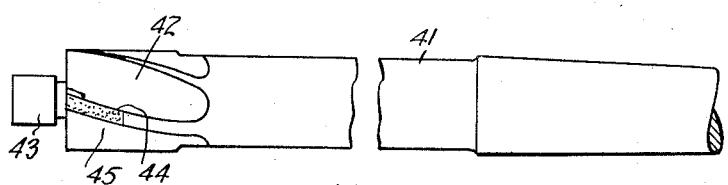
Fig. 17
Fig. 19
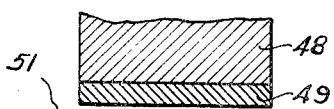
Fig. 20
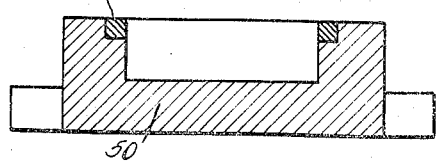
INVENTOR.
Joseph V. Emmons
BY
Fay, Oberlin & Fay
ATTORNEYS.

Patented Oct. 23, 1934

1,977,845

UNITED STATES PATENT OFFICE 1,977,845

CUTTING AND FORMING TOOL, IMPLEMENT, AND THE LIKE AND METHOD OF MAKING SAME

Joseph V. Emmons, Shaker Heights, Ohio, assignor to The Cleveland Twist Drill Company, Cleveland, Ohio, a corporation of Ohio Original application December 22, 1928, Serial No. 327,888. Divided and this application May 23, 1932, Serial No. 613,013

17 Claims. (Cl. 76—108)

This application is a division of application Serial No. 327,888, Joseph V. Emmons, filed December 22, 1928, now Patent No. 1,887,372.

The present invention relates to wearing parts and their manufacture. Its primary object, broadly stated, is to provide a process whereby working or wearing parts formed of the so-called "hard metal alloys" can be united with supporting or positioning parts formed of some other metal such as steel and particularly so-called tool steel or high-speed steel, in order to produce articles which will combine the extreme hardness and wear resisting characteristics of their wearing or working parts with the hardness, tensile strength and heat treating susceptibilities of their supporting or guiding parts.

More specifically, my invention contemplates a process which consists in roughly shaping a body, in roughly shaping wearing parts, in joining such wearing parts to such body, and in then finishing the resulting composite article. It is intended that the body of such article shall be of highspeed, tool, high-carbon, or air hardening steel, or of another metal or alloy having similar wear resisting and tensile properties, and that the wearing parts of such article shall be of one of the class of so-called "hard metal alloys" i. e., hard nonferrous metallic compositions, of which tungsten carbide, and like alloys are examples. The abovementioned body materials, in any condition, are advantageous because of their hardness and tensile strength, but my invention, with a view to developing either or both of these characteristics preferably provides for a heat treatment of the body of the article being made, such treatment being effected either prior to, simultaneously with, or subsequent to the operation by which the body is joined to its working or wearing parts. This joining operation may be carried out in any approved manner which will result in rigidly securing the individual parts together; and if brazing is selected to this end, the joint should preferably have an appreciable or considerable thickness in order that the interposed metal will be able to absorb the stresses due to the different coefficients of thermal expansion had by the parts being joined.

The process provided by my invention is applicable to the manufacture of cutting tools, drawing dies, gauges, forming instrumentalities, and to the wearing or working parts of mechanical devices and machines; in other words, to the manufacture of all articles which are required to have a supporting or guiding part which is both hard and strong, and a working or wearing part which is extremely hard or resistant to abrasion. It will be appreciated that my invention greatly increases the usefulness of the "hard metal alloys", and that the above-noted body characteristics are obtained without its being necessary to manufacture the entire article from these materials. In cases, it is possible to make a complete article from the alloys alone, but in general this practice is not available because of the costly nature of the material, its lack of strength and toughness, and to manufacturing difficulties which impose limitations as to the size and form of the products. My invention in this field is obviously advantageous.

To the accomplishment of the foregoing and related ends, said invention, then, consists of the means hereinafter fully described and particularly pointed out in the claims; the annexed drawings and the following description setting forth in detail several methods and a number of products exemplifying my invention, such disclosed procedures and products constituting, however, but some of various applications of the principles of my invention.

In said annexed drawings:—

Figs. 1 to 10, inclusive, are side and end elevations of some drills embodying the present improvements; Figs. 11 to 14, inclusive, are side and end elevations of some end mills which likewise embody the present improvements; Figs. 15 and 16 are side and end elevations of a reamer; Figs. 17 and 18 are side and end elevations of a counterbore; Fig. 19 is a side elevational view of a gauge; and Fig. 20 is a vertical sectional view of a shearing die and punch assembly.

Figure 1:
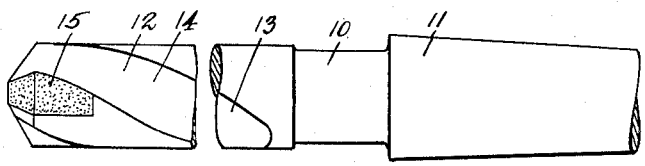
Figure 4:
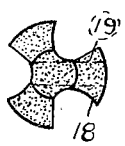
Figure 3:
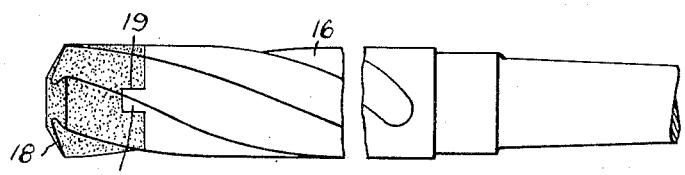
Figure 6:
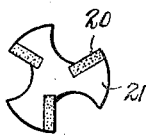
Figure 5:
Figure 8:
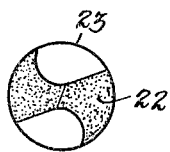
Figure 7:
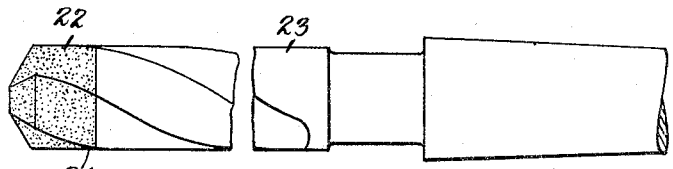
Figure 10:
Figure 9:
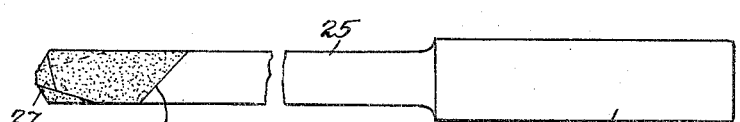

The twist drill shown in Figs. 1 and 2 consists of a body 10 which includes a shank 11 and an operating portion 12. Such operating portion has the usual flutes and lands 13 and 14, and the latter at their ends are provided with the inserted cutters 15. These cutters may be formed on a single piece or they may be formed on separate pieces, but in any case they are preferably so arranged as to effect nearly all of the cutting which the tool flutes or their end portions are adapted to effect when the operating end is constructed in the conventional manner. The drill illustrated in Figs. 3 and 4 has a fluted body 16 which terminates in a tongue 17, and the attached cutting end 18 has a groove 19 which, when engaged with such tongue, is additionally effective to resist the torsional stress to which the tool is subjected in use. The twist drill shown in Figs. 5 and 6 is similar to that illustrated in the next two preceding views, but the cutters 20 are here shown as inserts which are secured to the lands 21, instead of being formed on a tip constituting a longitudinal extension of the body. While the tools illustrated in Figs. 3 to 6 have been defined herein as "drills" nevertheless, due to the nature of their construction, they are catalogued and sold commercially, either as reamers or drills, and in actual use function primarily as reamers to enlarge existing holes since they will not drill the initial hole. The tip 22 of the drill shown in Figs. 7 and 8 is a distinct part which is attached to the body 23 by a layer of metal 24. Such tip is formed with the usual cutting edges, and its diameter is preferably about the same as the diameter of the body to which it is secured. The straight or flat drill which is illustrated in Figs. 9 and 10 consists of a body 25, a shank 26, and a cutting tip 27. This tip is provided with cutting edges, and at its plane of juncture with the body a layer of connecting metal 28 is interposed. In order to increase the areas upon which the operating stresses are effective, such plane of juncture between the tip and the body may be inclined in the manner shown.

The end mill illustrated in Figs. 11 and 12 includes a body 29 and a cutting point 30. This cutting point has the end and side edges 31 and 32, and its attaching portion is provided with a tongue 33 which fits within the body groove 34. In most respects, the end mill shown in Figs. 13 and 14 is similar to the end mill just described, but the cutters, instead of being formed on a tip secured in alignment with the body are of the inserted type. The edges 35 and 36 are adapted for performing the same functions as the corresponding parts of the tool shown in Figs. 11 and 12.

A reamer embodying the present improvements is illustrated in Figs. 15 and 16. The operating portion 37 is here shown as being integral with the body 38, and the cutters 39 are inserted in or attached to the lands 40. If desired, such cutters may be mechanically secured in place and arranged for removal and adjustment. The counterbore shown in Figs. 17 and 18 has a body 41 which is integral with the operating portion 42, and such operating portion is provided with a pilot 43. The cutters 44 are attached to the lands 45 in any suitable manner.

While the tool illustrated in Figs. 17 and 18 has just been specifically defined as a counterbore, such tool however, may be properly defined broadly as a special type of reamer for the reason that it, similarly to the tools illustrated in Figs. 3 to 6, 15 and 16, is employed for the purpose of enlarging or shaping a hole by turning. This tool similarly to the reamers or drills illustrated in Figs. 3 to 6 is provided with principal cutting edges of hard metal composition and auxiliary cutting edges occurring on the body of the tool. The reduced diameter of the body or shank 41 is provided so that the cutting end of the tool may penetrate the work for a depth greater than the axial extent of the head which includes the principal and auxiliary cutting edges.

Fig. 19 shows a gauge which consists of the body 46 and the end tips or working parts 47, these latter being secured in place and having their ends ground so that the tool has a specified length. The punch and die shearing assembly illustrated in Fig. 20 includes a punch body 48 which is provided with a working end 49, and a die body 50 which is provided with a working insert 51. Such working or wearing parts effect the actual cuttings of the material, and the punch and die bodies constitute supporting or backing members.

The body parts of the tools and other devices above described are formed of alloy steel, high-speed steel, high-carbon steel, tool steel, or of air or self-hardening steel; in other words, of an alloy or other material which is susceptible to heat treatment. It is noted high speed steel may be nitrided. The working parts of these articles are formed of a hard metal alloy; those containing considerable quantities of tungsten carbide or molybdenum carbide may be specifically mentioned as examples. Such working parts are preliminarily formed as by casting, by sintering and molding, or by grinding; and the body members are shaped as by casting, forging, tooling or grinding. When the separate elements have been so prepared, they may be secured together in working relation in any approved manner, and the composite article so formed then finished by grinding or lapping if this is necessary. By way of example, a brazing or welding method of securing the separate parts together will be described. The working parts and the body are fitted to each other in the manner above explained; the attaching surfaces are cleaned and temporarily fixed in place; and the article is then heated to a brazing temperature. During such heating, oxidation is prevented by maintaining a neutral or reducing atmosphere in blanketing relation to the work, or by the use of a protective covering of melted borax, or the like. When the article has reached a brazing temperature, the brazing metal may be applied to the joints between the body and the working parts and allowed to fill in the intervening spaces. It is not essential that the parts to be brazed shall have been very accurately fitted to each other; on the contrary, the contiguous surfaces are preferably somewhat rough or uneven, and they may even be slightly spaced from each other in order that the union formed by the liquid brazing metal shall have an appreciable thickness, and in order that such union shall be able to absorb the stresses due to the different coefficients of expansion of the materials being joined. I have found that an alloy consisting of 3% of aluminum and of 97% of copper makes a satisfactory brazing material, and that a joint formed of this material is elastic or ductile enough to obviate any tendency towards breakage or separation of the connected parts. It is noted that the melting point of this alloy is approximately 1900° F.

As examples of the treatment to which the body may be subjected, the following are mentioned; hardening, tempering, carburizing, case hardening, and nitriding. These may be the usual treatments known to workers in the art, and require no detail discussion. Such treatment (for various purposes) may be effected prior to, during, or subsequent to the brazing operation. It might be pointed out here that since the usual nitriding operation here contemplated is carried on at a temperature from about 950° F. to 1250° F., such operation will not damage the alloy employed for brazing, due to the much higher melting point of the latter as above pointed out. If the body has been annealed, tempered or hardened prior to the brazing, it is possible that this operation will result in some change in the physical properties of such body while at the brazing temperature, but the desired properties can be again imparted or the original condition restored during the cooling which succeeds the brazing and solidifies the metal of the joint. It is also possible to change or alter the original properties of the body by suitably controlling or regulating the cooling or quenching which follows after the application of the braze. Thus, a body which has been annealed prior to the heating for brazing purposes can be re-annealed during the cooling which follows the brazing operation, or during such cooling such a body can be hardened or tempered, if desired. Similarly, a body which has been tempered or hardened before the heating or brazing purposes can be hardened or re-hardened, tempered or re-tempered, or annealed during the cooling which follows the brazing operation. It is also possible to allow this cooling to proceed without regard to its effect upon the metal of the body, and to subsequently reheat the article in order that its cooling may be controlled and the desired physical properties imparted. Such operations as carburizing are preferably effected prior to the brazing, but if desired this operation can be effected either during the brazing or subsequent to the cooling which follows the brazing. These post-brazing treatments, of course, involve reheating of the article but it is possible to carry them out without detrimentally affecting the hard metal of the working parts or the bond by which such parts are secured to the body. It will be understood that all heating or other operations effected upon the body are of such a character as to not materially damage the hard metal of the working parts or to change its physical properties. It will also be understood that the heat treatments to which the body is subjected may be intended for developing either the hardness or the tensile or the torsional strength of the metal, as in some cases one of these properties may be preferable to the other.

Such development of the hardness and strength may be for the purpose of increasing the resistance to wear of pilots, guides, auxiliary cutting edges or other parts of the tools subject to wear in service. If the heat treatment of the body subsequent to the cooling which follows the brazing is of such a nature as to tend to detrimentally affect the working parts, such parts may be protected during this treatment so that their properties will remain unimpaired. Obviously, the composition and properties of the metal used in the bond between the separate parts can be varied in any manner made necessary by the character of the parts, or by the nature of the treatment to which the body is to be subjected. Finally, it may be stated that my invention contemplates the use of other than welding and brazing processes for securing the parts together; in some cases mechanical securing means will be quite satisfactory.

Other modes of applying the principle of my invention may be employed instead of the one explained, change being made as regards the mechanism herein disclosed, provided the means stated by any of the following claims or the equivalent of such stated means be employed.

I, therefore, particularly point out and distinctly claim as my invention:

1. As an article of manufacture, a composite tool having primary and secondary wearing surfaces or cutting edges, comprising a body portion formed of steel, a member of hard non-ferrous metallic composition atomically bonded to said body and upon which said primary wearing surface or cutting edge is formed, and said body hardened to provide thereon said secondary wearing surface or cutting edge.

2. As an article of manufacture, a rotary cutting tool having primary and secondary cutting edges, comprising a body portion of steel, a member of hard non-ferrous metallic composition atomically bonded to said body and upon which said primary cutting edge is formed, and said body hardened to provide thereon said secondary cutting edge.

3. As an article of manufacture, a composite tool having primary and secondary wearing surfaces or cutting edges, comprising a body portion formed of steel, a member of hard non-ferrous metallic composition atomically bonded to said body and upon which said primary wearing surface or cutting edge is formed, and said body nitrided to provide thereon said secondary wearing surface or cutting edge.

4. As an article of manufacture, a rotary cutting tool having primary and secondary cutting edges, comprising a body portion of steel, a member of hard non-ferrous metallic composition atomically bonded to said body and upon which said primary cutting edge is formed, and said body nitrided to provide thereon said secondary cutting edge.

5. As an article of manufacture, a drill having primary and secondary cutting edges, comprising a body portion of steel, a member of hard non-ferrous metallic composition atomically bonded to said body and upon which said primary cutting edge is formed, and said body hardened to provide thereon said secondary cutting edge.

6. As an article of manufacture, a reamer having primary and secondary cutting edges, comprising a body portion of steel, a member of hard non-ferrous metallic composition atomically bonded to said body and upon which said primary cutting edge is formed, and said body hardened to provide thereon said secondary cutting edge.

7. The process of making a composite tool having primary and secondary wearing surfaces or cutting edges, which comprises providing a body of steel, forming a suitable matrix in the body of the tool to receive a member of hard, non-ferrous metallic composition, securing said member in said matrix to provide said primary wearing surface or cutting edge, and hardening said body to provide said secondary wearing surface or cutting edge.

8. The process of making a composite tool having primary and secondary wearing surfaces or cutting edges, which comprises providing a body of steel, forming a suitable matrix in the body of the tool to receive a member of hard, non-ferrous metallic composition, securing said member in said matrix to provide said primary wearing surface or cutting edge, and hardening a secondary active surface on said body to provide said secondary wearing surface or cutting edge.

9. The process of making a composite tool having primary and secondary wearing surfaces or cutting edges, which comprises providing a body of steel, forming a suitable matrix in the body of the tool to receive a member of hard non-ferrous metallic composition, hardening said body to provide said secondary wearing surface or cutting edge, and thereafter securing said member in said matrix to provide said primary wearing surface or cutting edge.

10. The process of making a rotary cutting tool having primary and secondary cutting edges, which comprises providing a body of steel, forming a suitable matrix in the body of the tool to receive a member of hard non-ferrous metallic composition, securing said member in said matrix to provide said primary cutting edge, and hardening said body to provide said secondary cutting edge.

11. The process of making a composite tool having primary and secondary wearing surfaces or cutting edges, comprising shaping a principal wearing element of hard non-ferrous metallic composition, shaping a supporting body of steel, which is capable of being strengthened, with a matrix to accommodate said principal wearing element, fitting and securing the principal wearing element to said matrix to provide said primary wearings surfaces or cutting edges, strengthening said supporting body by heat treatment to provide a support having greater tensile strength than the principal wearing element and to provide said secondary wearing surface or cutting edge and reducing said composite tool to desired size and shape by abrasive means.

12. The process of making a composite cutting tool having primary and secondary wearing surfaces or cutting edges, comprising forming a body of nitridable steel, shaping a blade of hard non-ferrous metallic composition, attaching said blade to said body to provide said primary wearing surface or cutting edge, and subjecting said article to nitrogen hardening to provide said secondary wearing surface or cutting edge.

13. The process of making a composite cutting tool having primary and secondary wearing surfaces or cutting edges, which comprises providing a body of nitridable steel, forming a suitable notch in the working end of the tool to receive a cutting member of hard non-ferrous metallic composition unaffected by brazing temperatures, brazing said cutting member in said notch to provide said primary wearing surface or cutting edge, and thereafter nitrogen-hardening said tool to provide said secondary wearing surface or cutting edge.

14. The process of making a composite rotary cutting tool having primary and secondary cutting edges, comprising forming a body of nitridable steel, shaping a blade of hard non-ferrous metallic composition, attaching said blade to said body to provide said primary cutting edge, and nitrogen hardening said body to provide thereon said secondary cutting edge.

15. The process of making a drill having primary and secondary cutting edges, which comprises providing a body of steel, forming a suitable matrix in the body of the drill to receive a member of hard non-ferrous metallic composition, securing said member in said matrix to provide said primary cutting edge, and hardening said body to provide said secondary cutting edge.

16. The process of making a reamer having primary and secondary cutting edges, which comprises providing a body of steel, forming a suitable matrix in the body of the reamer to receive a member of hard non-ferrous metallic composition, securing said member in said matrix to provide said primary cutting edge, and hardening said body to provide said secondary cutting edge.

17. The process of making composite reamers of the character described comprising forming the body of nitridable easily machinable steel so as to provide chip flutes and cutting edge and pilot portions of body steel, forming suitable notches at the working ends of the cutting edge portions to receive inserted cutting edges of special hard wear-resisting material unaffected by brazing temperatures, brazing said inserted cutting edges in said notches with a brazing material having a melting point above 1300° F., and grinding said tool to correct size and alignment, and thereafter nitrogen-hardening said tool at a temperature below 1250°, substantially as described, thereby producing an unwarped tool having primary cutting edges of inserted wear-resistant steel and secondary cutting edges, pilot surfaces and chip flutes formed of the nitride surface-hardened body steel.

JOSEPH V. EMMONS.